(12) United States Patent
Etzkorn et al.

(10) Patent No.: US 12,554,153 B2
(45) Date of Patent: Feb. 17, 2026

(54) DISPLAY SYSTEM

(71) Applicant: 3M INNOVATIVE PROPERTIES COMPANY, St. Paul, MN (US)

(72) Inventors: Stephen J. Etzkorn, Woodbury, MN (US); Michael L. Steiner, New Richmond, WI (US); Kevin W. Gotrik, Hudson, WI (US); Luke A Schroeder, Maplewood, MN (US); Nicholas A. Johnson, Burnsville, MN (US); John A. Wheatley, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 279 days.

(21) Appl. No.: 18/130,556

(22) Filed: Apr. 4, 2023

(65) Prior Publication Data

US 2023/0341715 A1 Oct. 26, 2023

Related U.S. Application Data

(60) Provisional application No. 63/332,861, filed on Apr. 20, 2022.

(51) Int. Cl.
*G02F 1/13* (2006.01)
*G02F 1/01* (2006.01)
(Continued)

(52) U.S. Cl.
CPC .......... *G02F 1/1323* (2013.01); *G02F 1/0136* (2013.01); *G02F 1/0311* (2013.01); *G02F 1/294* (2021.01)

(58) Field of Classification Search
CPC .................. G02F 1/1323; G02F 1/13471
See application file for complete search history.

(56) References Cited

U.S. PATENT DOCUMENTS 8,558,853 B2 10/2013 Sagardoyburu et al.
10,725,228 B2 7/2020 Choi et al.
(Continued)

FOREIGN PATENT DOCUMENTS

KR 2018099138 A * 9/2018 ............... G02F 1/13
WO 2018159922 A1 9/2018

OTHER PUBLICATIONS

Kim, "Fabrication of ideal geometric-phase holograms with arbitrary wavefronts", Optica, Nov. 2015, vol. 2, No. 11, pp. 958-964.
(Continued)

*Primary Examiner* — Alexander P Gross
(74) *Attorney, Agent, or Firm* — Jonathan L. Tolstedt (57) ABSTRACT

A display system includes a display configured to emit an image for viewing by a viewer. The display system further includes one or more phase lens layers disposed on, and substantially co-extensive in length and width with the display. Each of the one or more phase lens layers is configured to have different first and second focal lengths for different respective first and second polarization states. The display system further includes a first polarization modifying layer disposed between the display and the one or more phase lens layers. The first polarization modifying layer is configured to receive the emitted image and transmit a transmitted image. The transmitted image has the first and second polarization states in response to different respective first and second signals applied to the first polarization modifying layer.

9 Claims, 9 Drawing Sheets

(51) Int. Cl.
*G02F 1/03* (2006.01)
*G02F 1/29* (2006.01)

(56) References Cited

U.S. PATENT DOCUMENTS

| | | |
|---|---|---|
| 10,739,651 B2 | 8/2020 | Sharp et al. |
| 10,935,790 B2 | 3/2021 | Lu et al. |
| 10,948,779 B2 | 3/2021 | Jamali et al. |
| 11,029,566 B2 | 6/2021 | Robinson et al. |
| 2010/0295755 A1 | 11/2010 | Broughton et al. |
| 2019/0064413 A1* | 2/2019 | Kobayashi ............ G02B 5/3083 |
| 2019/0285891 A1 | 9/2019 | Lam et al. |
| 2020/0081315 A1* | 3/2020 | Jamali ..................... G02B 5/30 |
| 2020/0310204 A1 | 10/2020 | Peng et al. |
| 2021/0109369 A1* | 4/2021 | Verstegen ............ H04N 13/305 |

OTHER PUBLICATIONS

Komanduri, "Multi-twist retarders: broadband retardation control using self-aligning reactive liquid crystal layers", Optics Express, 2013, vol. 21, No. 1 pp. 404-420.

\* cited by examiner

DISPLAY SYSTEM

TECHNICAL FIELD

The present disclosure relates generally to a display system. Particularly, the present disclosure relates to a switchable privacy display system.

BACKGROUND

Privacy films are generally used in electronic display devices in order to protect information visible on screens from persons located at oblique angles. Traditionally, a privacy film is applied to a viewing surface of a privacy display, such that an image content of the privacy display can be viewed selectively at intended angles. Typically, when a viewer is positioned within a range of narrow viewing angles relative to a normal to a surface of the privacy film, the image content being displayed is viewable through the privacy film. As the position of the viewer changes, such that the viewing angle increases relative to the normal, an amount of coherent light transmitted through the privacy film decreases until a maximum viewing angle is reached and the image content being displayed may be no longer viewable, or viewable with a very low intensity.

SUMMARY

In a first aspect, the present disclosure provides a display system. The display system is configured to display a pixelated image at a pixelated output surface thereof for viewing by a viewer. The pixelated output surface includes a plurality of two-dimensionally arranged output pixels. Each of the output pixels is configured to emit an image cone switchable between different first and second polarization states by an applied signal. Switching the polarization state of the emitted image cone between the first and second polarization states causes a full angle (full width at half maximum) of the emitted image cone to change by at least 2 degrees while causing a total intensity of the emitted image cone to change by less than about 20%.

In a second aspect, the present disclosure provides a display system. The display system includes a display configured to emit an image for viewing by a viewer. The display system further includes one or more phase lens layers disposed on, and substantially co-extensive in length and width with the display. Each of the one or more phase lens layers is configured to have different first and second focal lengths for different respective first and second polarization states. The display system further includes a first polarization modifying layer disposed between the display and the one or more phase lens layers. The first polarization modifying layer is configured to receive the emitted image and transmit a transmitted image. The transmitted image has the first and second polarization states in response to different respective first and second signals applied to the first polarization modifying layer.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

The present disclosure relates to a display system with a switchable privacy feature. The display system may be used with electronic devices, such as computer monitors, televisions, mobile phones, personal digital assistants (PDAs), laptops, notebooks, wearable devices, and other portable electronic devices.

Electronically switchable privacy displays are currently available in the market. An electronically switchable privacy display typically has a non-removable configuration, i.e., a user can switch between sharing and privacy modes without a need to remove any film from a viewing surface of the display. Conventional electronically switchable privacy displays usually absorb light at wider viewing angles (i.e., viewing angles greater than intended viewing angles relative to a normal to the display) while transmitting the light at narrow viewing angles (i.e., viewing angles within the intended viewing angles relative to the normal to the display). However, such displays may not provide adequate privacy performance and may further require the use of a collimated backlight either via a louver or via a turning film. With the application of the louver or turning film, a sharing mode may be selected for the narrow viewing angles, however, there may be limited distinction between the sharing mode and the privacy mode in the conventional electronically switchable privacy display.

In some other display systems, switchable privacy feature is achieved by using a polymer dispersed liquid crystal (PDLC) cell. The PDLC cell is typically employed above a film stack in a collimated backlight unit. In case of absence of an electric field, the PDLC cell diffuses the light. In response to an application of the electric field, the PDLC cell transmits the collimated light. However, since the PDLC cell diffuses the light after it is collimated, it may decrease an overall efficiency of the display system.

The present disclosure relates to a display system. The display system includes a display configured to emit an image for viewing by a viewer. The display system further includes one or more phase lens layers disposed on, and substantially co-extensive in length and width with the display. Each of the one or more phase lens layers is configured to have different first and second focal lengths for different respective first and second polarization states. The display system further includes a first polarization modifying layer disposed between the display and the one or more phase lens layers. The first polarization modifying layer is configured to receive the emitted image and transmit a transmitted image. The transmitted image has the first and second polarization states in response to different respective first and second signals applied to the first polarization modifying layer.

Each of the one or more phase lens layers has the different first and second focal lengths for the different respective first and second polarization states. In some cases, the first focal length of each of the one or more phase lens layers may be positive and the second focal length of each of the one or more phase lens layers may be negative. In such cases, each of the one or more phase lens layers may focus the transmitted image having the first polarization state and may scatter the transmitted image having the second polarization state. Therefore, the display system may operate in a privacy mode when each of the one or more phase lens layers focuses the transmitted image. Further, the display system may operate in a sharing mode when each of the one or more phase lens layers scatters the transmitted image. Each of the one or more phase lens layers is configured to focus or scatter the transmitted image based on a polarization state (one of the first and second polarization states) of the transmitted image.

The transmitted image has the first polarization state in response to the first signal applied to the first polarization modifying layer. The transmitted image has the second polarization state in response to the second signal applied to the first polarization modifying layer. Therefore, a polarization state (one of the first and second polarization states) of the transmitted image can be selected by applying a corresponding signal (one of the first and second signals) to the first polarization modifying layer. Thus, the display system may operate in the privacy mode, or the sharing mode based on the polarization state of the transmitted image, which is further based on the signal applied to the first polarization modifying layer.

A user may select the desired signal based on desired application attributes. For example, if the first focal length of each of the one or more phase lens layers is positive and the user desires to operate the display device in the privacy mode, the user may select (e.g., via a user interface) the first signal to be applied to the first polarization modifying layer, such that each of the one or more phase lens layers focuses the transmitted image having the first polarization state. Further, if the second focal length of each of the one or more phase lens layers is negative and the user desires to operate the display device in the sharing mode, the user may select the second signal to be applied the first polarization modifying layer, such that each of the one or more phase lens layers scatters the transmitted image having the second polarization state.

Based on the signal (i.e., one of the first signal and the second signal) applied to the first polarization modifying layer, the display system of the present disclosure may be switched between the privacy and sharing modes.

The display system of the present disclosure is configured to display a pixelated image at a pixelated output surface thereof for viewing by the viewer. The pixelated output surface includes a plurality of two-dimensionally arranged output pixels. Each of the output pixels is configured to emit an image cone switchable between the different first and second polarization states by an applied signal. Switching the polarization state of the emitted image cone between the first and second polarization states causes a full angle (full width at half maximum, i.e., FWHM) of the emitted image cone to change by at least 2 degrees while causing a total intensity of the emitted image cone to change by less than about 20%.

Therefore, based on the applied signal, the image cone emitted by each of the output pixels is switchable between the first and second polarization states. In some cases, the image cone has the first polarization state in response to the first signal applied to the first polarization modifying layer. Further, the image cone has the second polarization state in response to the second signal applied to the first polarization modifying layer. The full angle (full width at half maximum or FWHM) of the image cone changes by at least 2 degrees upon switching the polarization state of the image cone between the first and second polarization states. In other words, the full angle of the image cone changes by at least 2 degrees upon switching the applied signal between the first and second signals.

As in some cases, the full angle of the image cone changes by at least 5 degrees upon switching the polarization state of the image cone between the first and second polarization states, or by switching the applied signal between the first and second signals, there may be a considerable distinction between the privacy mode and the sharing mode of the display system. For example, for the first polarization state (selected by applying the first signal to the first polarization modifying layer), an off-axis viewer may not be able to clearly view the image cone.

Moreover, as the display system of the present disclosure does not use any absorptive components for focusing or scattering a light, the display system may therefore have an improved overall efficiency. The display system of the present disclosure uses only refractive elements to either focus or scatter an input light. The display system of the present disclosure may also be used for focusing and/or scattering a collimated input light incident on the one or more phase lens layers. A desirable output of the display system may vary based on strength or optical power of the one or more phase lens layers.

Moreover, the total intensity of the image cone changes by less than about 20% upon switching the polarization state of the image cone between the first and second polarization states. The image cone is switchable between the first and second polarization states based on the applied signal. Therefore, the total intensity of the image cone changes by less than about 20% upon switching the applied signal between the first and second signals. Further, the total intensity of the image cone in one of the privacy and sharing modes of the display system differs by less than about 20% from the total intensity of the image cone in the other of the privacy and sharing modes of the display system. In an example, upon switching the applied signal from the first signal to the second signal, the total intensity of the image cone may increase by less than about 20%. Further, upon switching the applied signal from the second signal to the first signal, the total intensity of the image cone may decrease by less than about 20%.

In other words, upon switching the display system between the privacy and sharing modes, there is a minimal change in the total intensity of the image cone for the viewer. This may improve an overall experience of the user while viewing the image content on the display system in the privacy mode as well as the sharing mode. Further, an axial luminance for the on-axis viewer may change upon switching the display system between the privacy and sharing modes. Particularly, in the privacy mode, the axial luminance may relatively increase and, therefore, brightness of the display system may be adjusted to save power and allow a consistent experience to the on-axis viewer.

Figure 1:
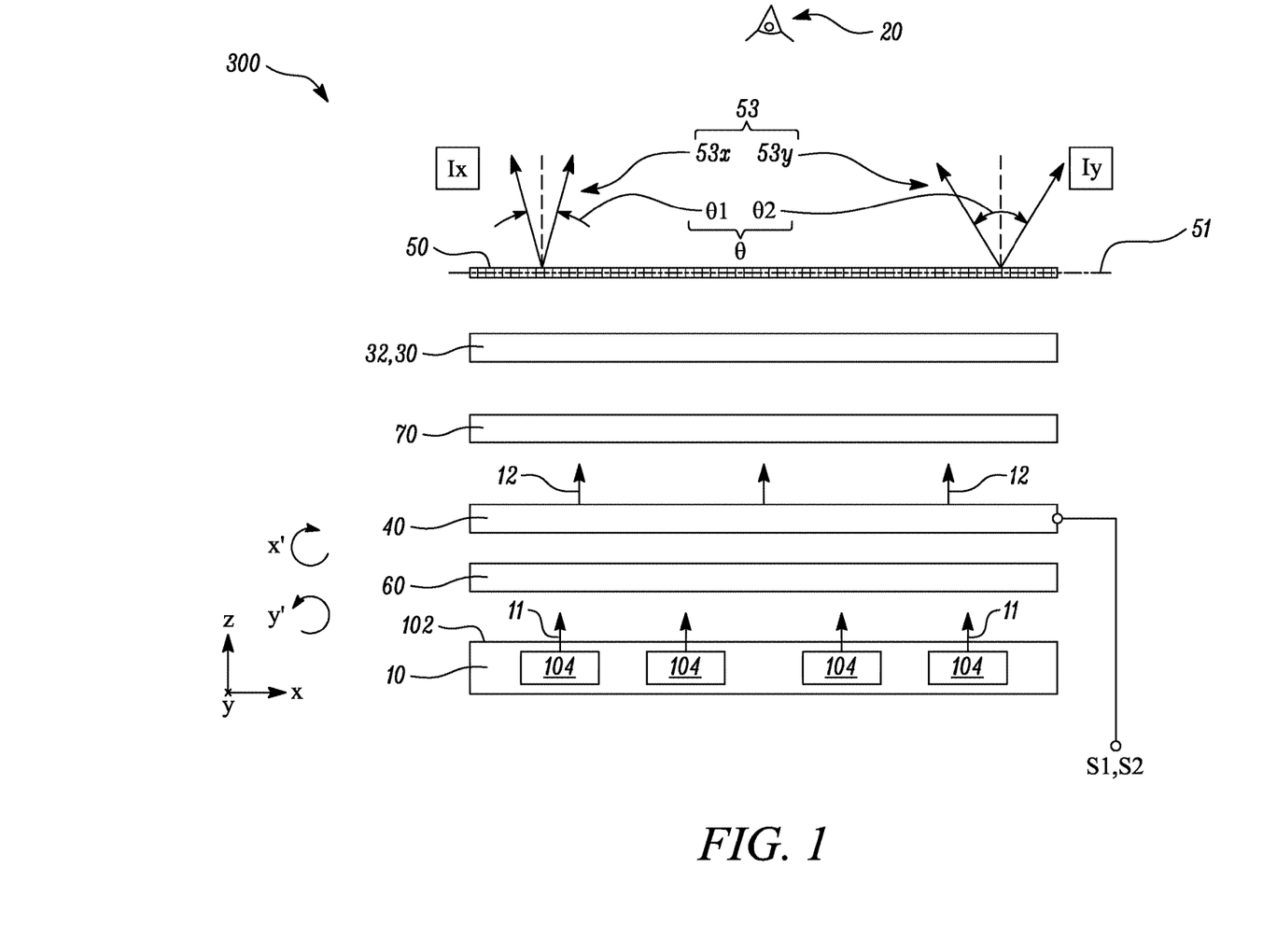
FIG. 1 is a schematic sectional view of a display system, according to an embodiment of the present disclosure.

Referring now to FIG. 1, a display system 300 is illustrated according to an embodiment of the present disclosure. The display system 300 defines mutually orthogonal x, y, and z-axes. The x and y-axes are in-plane axes of the display system 300, while the z-axis is a transverse axis disposed along a thickness of the display system 300. In other words, the x and y-axes are disposed along a plane of the display system 300, while the z-axis is perpendicular to the plane of the display system 300.

The display system 300 includes a display 10 configured to emit an image 11 for viewing by a viewer 20. In some embodiments, the viewer 20 can be interchangeably referred to herein as an on-axis viewer 20. The display 10 is configured to emit the image 11 through an emission surface 102. In some cases, the display 10 may include an organic light emitting diode (OLED) display panel. In some other cases, the display 10 may include a liquid crystal display (LCD) panel.

In the illustrated embodiment of FIG. 1, the display 10 includes at least one illumination source 104 configured to emit the image 11. In some embodiments, the at least one illumination source 104 is a visible light source. In some embodiments, the at least one illumination source 104 may include at least one of filament or arc lamps, light emitting diodes (LEDs), linear cold cathode fluorescent tubes, non-linear cold cathode fluorescent tubes, flat fluorescent panels, or external electrode fluorescent lamps. In the illustrated embodiment of FIG. 1, the display 10 includes multiple illumination sources 104 disposed in a direct-lit configuration. However, in some other cases, the display 10 may additionally or alternatively include one or more illumination sources in an edge-lit configuration. The display 10 may further include a reflector (not shown).

Further, in some embodiments, the image 11 emitted by the at least one illumination source 104 is generally unpolarized. However, in some other cases, the image 11 may be an at least partially polarized image. For the purpose of explanation, the image 11 may be treated as an image having an unknown or arbitrary polarization state or distribution of polarization states. The display shown in FIG. 1 is exemplary in nature, and the display 10 may have alternative configurations within the scope of the present disclosure.

The display system 300 further includes one or more phase lens layers 32 disposed on, and substantially co-extensive in length (i.e., along the x-axis) and width (i.e., along the y-axis) with, the display 10. Specifically, the one or more phase lens layers 32 and the display 10 may be substantially co-extensive with each other in the in-plane axes of the display system 300 (i.e., x-y plane). In some embodiments, the display system 300 may include a backlight unit including one or more phase lens layers 32. In the illustrated embodiment of FIG. 1, the one or more phase lens layers 32 include a first phase lens layer 30. In some embodiments, each of the one or more phase lens layers 32 is a Pancharatnam-Berry (PB) phase lens. One of the properties of a PB phase lens is to modulate a phase shift using liquid crystal (LC) molecules to provide a special profile depending on a polarization state of an input light or an input image. The PB phase lens exhibits distinct polarization selectivity, manifesting opposite optical power to circularly polarized light with opposite handedness. In general, upon incidence of a light having right circularly polarization state, the PB phase lens is activated as a convex lens and an output light is modulated to have left circularly polarization state.

Similarly, the PB phase lens operates as a concave lens for a light having left circularly polarization state and an output light is modulated to have right circularly polarization state.

Each of the one or more phase lens layers 32 is configured to have different first and second focal lengths (described later) for different respective first and second polarization states. In some embodiments, the first and second polarization states are orthogonal to each other. In some embodiments, the first and second polarization states are circularly polarization states. In some embodiments, the first polarization state is a right circularly polarization state (denoted by x' in FIG. 1) and the second polarization state is a left circularly polarization state (denoted by y' in FIG. 1). In other words, the first and second polarization states are right and left circularly polarization states, respectively. In some other embodiments, the first and second polarization states are linear polarization states. In some embodiments, the first polarization state is along the x-axis, while the second polarization state is along the y-axis.

Figure 2A:
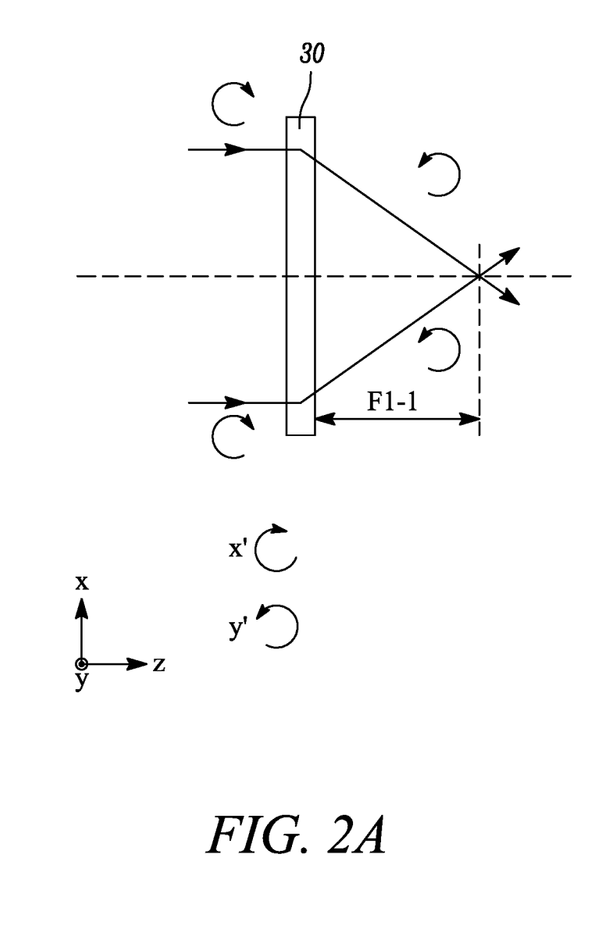
FIGS. 2A and 2B are schematic sectional views illustrating an operating principle of a first phase lens layer of the display system of FIG. 1, according to an embodiment of the present disclosure.

FIGS. 2A and 2B are sectional views illustrating an operating principle of the first phase lens layer 30, according to an embodiment of the present disclosure. As shown in FIG. 2A, the first phase lens layer 30 has a first focal length F1-1 for the first polarization state (illustrated as the right circularly polarization state). The first phase lens layer 30 functions as the convex lens for the first polarization state (i.e., the right circularly polarization state). In other words, the first phase lens layer 30 focuses an input light having the first polarization state to transmit a focused output light having the second polarization state (i.e., the left circularly polarization state).

Figure 2B:
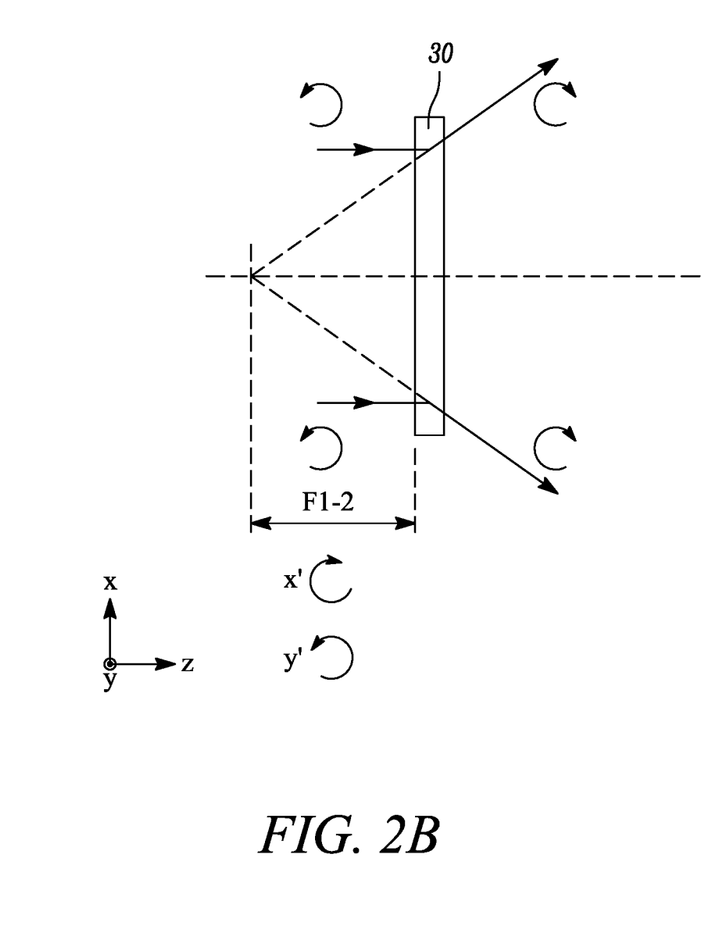

As shown in FIG. 2B, the first phase lens layer 30 has a second focal length F1-2 for the second polarization state (illustrated as the left circularly polarization state). The first phase lens layer 30 functions as the concave lens for the second polarization state (i.e., the left circularly polarization state). In other words, for the second polarization state, the first phase lens layer 30 scatters an input light having the second polarization state to transmit a scattered output light having the first polarization state (i.e., the right circularly polarization state). Therefore, with reference to FIGS. 2A and 2B, the first phase lens layer 30 is configured to have the different first and second focal lengths F1-1, F1-2 for the different respective first and second polarization states. As stated above, in the illustrated embodiment of FIGS. 2A and 2B, the first and second polarization states are the right and left circularly polarization states, respectively.

Referring again to FIG. 1, the display system 300 further includes a first polarization modifying layer 40 disposed between the display 10 and the one or more phase lens layers 32. The first polarization modifying layer 40 is configured to receive the emitted image 11 and transmit a transmitted image 12. The transmitted image 12 has the first and second polarization states in response to different respective first and second signals S1, S2 applied to the first polarization modifying layer 40. In some embodiments, the applied first and second signals S1, S2 includes one or more of voltage and current signals.

In some embodiments, the first polarization modifying layer 40 includes one or more of a Pockels cell and a Soleil-Babinet compensator. In general, the Pockels cell is a voltage controlled waveplate and includes an electro-optic material, such as an electro-optic crystal (e.g., LiNbO3 or LiTaO3), whose refractive index changes by applying a signal, such as a voltage signal, to the electro-optic material. The phase of a polarized light beam passing through the electro-optic material of the Pockels cell can be changed by the application of the voltage signal. Therefore, applying a prescribed voltage to the Pockels cell may result in a predetermined alteration of a polarization property of a light beam passing through the Pockels cell.

The Soleil-Babinet compensator is a mechanically controlled waveplate and includes two birefringent wedges, one of which is capable of moving with respect to (sliding against) the other to change the effective thickness of the waveplate. Hence, the phase of a polarized light beam passing through the Soleil-Babinet compensator can be changed by the movement of the wedges relative to each other. In some cases, the Soleil-Babinet compensator incudes two wedges of quartz, cut with their optical axes perpendicular to each other.

Figure 3A:
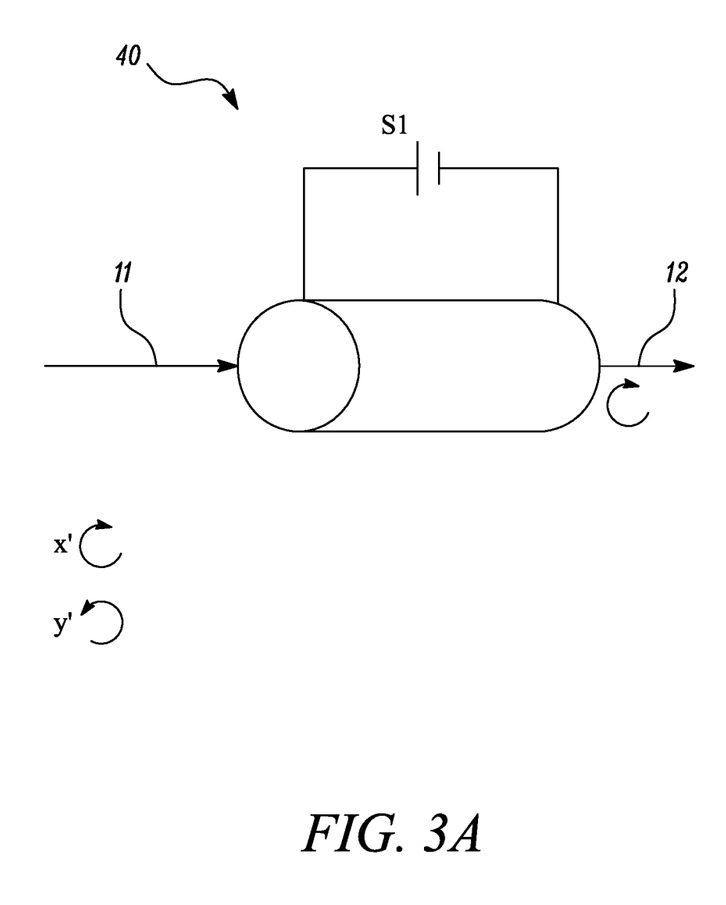
FIGS. 3A and 3B are schematic sectional views of a first polarization modifying layer of the display system of FIG. 1, according to different embodiments of the present disclosure.

FIG. 3A is a schematic sectional view of the first polarization modifying layer 40 as the Pockels cell, according to an embodiment of the present disclosure. As shown in FIG. 3A, in response to the applied first signal S1 (i.e., a voltage signal), the refractive index of the electro-optic material of the first polarization modifying layer 40 is changed, such that the transmitted image 12 (i.e., an output image) has the first polarization state (i.e., the right circularly polarization state). The transmitted image 12 may have the second polarization state (i.e., the left circularly polarization state) in response to the applied second signal S2 (shown in FIG. 1). In some cases, the transmitted image 12 may have the first polarization state along the x-axis in response to the applied first signal S1, and the second polarization state along the y-axis in response to the applied second signal S2.

Figure 3B:
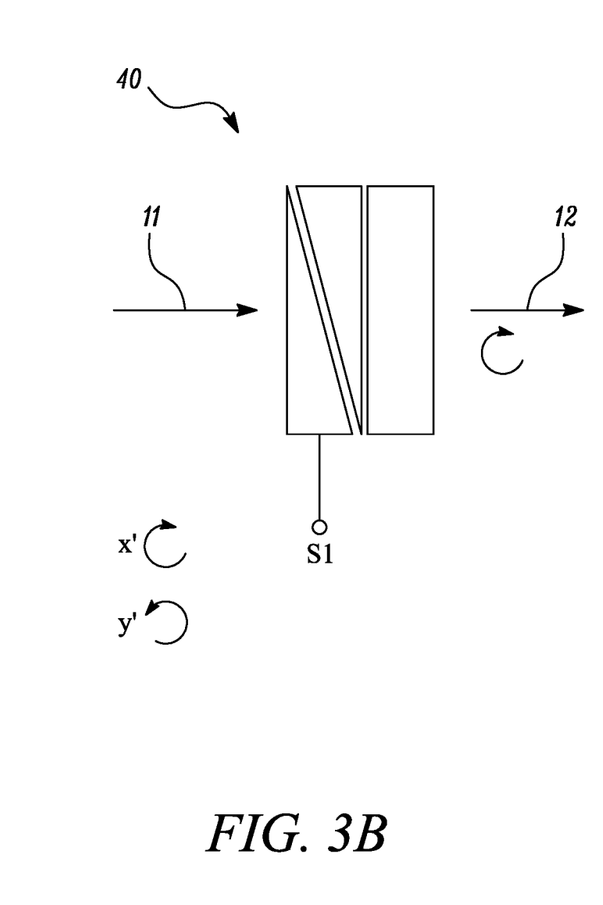

FIG. 3B is a schematic sectional view of the first polarization modifying layer 40 as the Soleil-Babinet compensator, according to an embodiment of the present disclosure. As shown in FIG. 3B, in response to the applied first signal S1, the birefringent wedges move relative to each other to vary the path of the image 11, such that the transmitted image 12 (i.e., an output image) has the first polarization state (i.e., the right circularly polarization state). The transmitted image 12 may be configured to have the second polarization state (i.e., the left circularly polarization state) in response to the applied second signal S2.

Referring to FIGS. 1 to 3B, the first focal length F1-1 (illustrated in FIG. 2A) of the first phase lens layer 30 may be positive and the second focal length F1-2 (illustrated in FIG. 2B) of the first phase lens layer 30 may be negative. In such cases, the first phase lens layer 30 may focus the transmitted image 12 having the first polarization state and may scatter the transmitted image 12 having the second polarization state. Therefore, the display system 300 may operate in a privacy mode if each of the one or more phase lens layers 32 focuses the transmitted image 12. Further, the display system 300 may operate in a sharing mode if each of the one or more phase lens layers 32 scatters the transmitted image 12. Each of the one or more phase lens layers 32 is configured to focus or scatter the transmitted image 12 based on the polarization state (one of the first and second polarization states) of the transmitted image 12.

In response to the transmitted image 12 having the first polarization state, the one or more phase lens layers 32 (i.e., the first phase lens layer 30) function as the convex lens to transmit a focused image toward the viewer 20. Similarly, in response to the transmitted image 12 having the second polarization state, the one or more phase lens layers 32 (i.e., the first phase lens layer 30) function as the concave lens to transmit a scattered image toward the viewer 20. The transmitted image 12 has the first polarization state in response to the first signal S1 applied to the first polarization modifying layer 40. The transmitted image 12 has the second polarization state in response to the second signal S2 applied to the first polarization modifying layer 40. Therefore, a polarization state (one of the first and second polarization states) of the transmitted image 12 can be selected by applying a corresponding signal (one of the first and second signals S1, S2) to the first polarization modifying layer 40. Thus, the display system 300 may operate in the privacy mode or the sharing mode based on the polarization state (one of the first and second polarization states) of the transmitted image 12, which is further based on the signal (one of the first and second signals S1, S2) applied to the first polarization modifying layer 40.

A user may select (e.g., via a user interface) the desired signal from the first and second signals S1, S2 based on desired application attributes. For example, if the first focal length F1-1 of the first phase lens layer 30 is positive and a user desires to operate the display device 300 in the privacy mode, the user may select the first signal S1 to be applied to the first polarization modifying layer 40, such that the first phase lens layer 30 focuses the transmitted image 12 having the first polarization state. Further, if the second focal length F1-2 of the first phase lens layer 30 is negative and the user desires to operate the display device 300 in the sharing mode, the user may select the second signal S2 to be applied to the first polarization modifying layer 40, such that the first phase lens layer 30 scatters the transmitted image 12 having the second polarization state. Based on the signal (i.e., one of the first signal S1 and the second signal S2) applied to the first polarization modifying layer 40, the display system 300 may be switched between the privacy and sharing modes. Hence, the display system 300 of the present disclosure is an electronically switchable privacy display system.

Referring again to FIG. 1, in some embodiments, the display system 300 further includes a polarizer 60 disposed between the first polarization modifying layer 40 and the display 10. In some embodiments, the polarizer 60 is a linear polarizer. The polarizer 60 may be any suitable reflective polarizer, including a wire-grid polarizer or a multilayer birefringent reflective polarizer.

In cases where the polarizer 60 is the reflective linear polarizer with a transmission axis along the x-axis, the polarizer 60 may substantially transmit the image 11 having the first polarization state and substantially reflect the image 11 having the second polarization state for a predetermined wavelength range. In cases where the polarizer 60 is the reflective linear polarizer with the transmission axis along the y-axis, the polarizer 60 may substantially transmit the image 11 having the second polarization state and substantially reflect the image 11 having the first polarization state for the predetermined wavelength range.

In some other embodiments, the polarizer 60 is a circular polarizer. The circular polarizer may include a linear polarizer and a quarter-wave plate. The polarizer 60 may be a reflective circular polarizer. In some cases, the reflective circular polarizer may substantially transmit the image 11 having the first polarization state (i.e., the right circularly polarization state) and substantially reflect the image 11 having the second polarization state (i.e., the left circularly polarization state) for the predetermined wavelength range. In other cases, the reflective circular polarizer may substantially transmit the image 11 having the second polarization state (i.e., the left circularly polarization state) and substantially reflect the image 11 having the first polarization state (i.e., the right circularly polarization state) for the predetermined wavelength range.

In some embodiments, when the image 11 emitted by the at least one illumination source 104 is at least partially linearly polarized, the polarizer 60 may be the linear polarizer. When the image 11 emitted by the at least one illumination source 104 is at least partially circularly polarized, the polarizer 60 may be the circular polarizer. The selection of the polarizer 60 as the linear polarizer or the circular polarizer may be based on desired application attributes.

In the illustrated embodiment of FIG. 1, the display system 300 further includes a quarter-wave retarder 70 disposed between the one or more phase lens layers 32 and the first polarization modifying layer 40. The quarter-wave retarder 70 may include a quarter-wave polarization state that can be aligned at 45 degrees to the first polarization state. In this configuration, a linearly polarized light passing through the quarter-wave retarder 70 may result in a circularly polarized light and vice versa.

In an example, the transmitted image 12 having the first polarization state along the x-axis passing through the quarter-wave retarder 70 may result in an output image having the right circularly polarization state. Similarly, the transmitted image 12 having the right circularly polarization state passing through the quarter-wave retarder 70 may result in an output image having the first polarization state along the x-axis. Further, the transmitted image 12 having the second polarization state along the y-axis passing through the quarter-wave retarder 70 may result in an output image having the left circularly polarization state. Similarly, the transmitted image 12 having the left circularly polarization state passing through the quarter-wave retarder 70 may result in an output image having the second polarization state along the y-axis.

Figure 4:
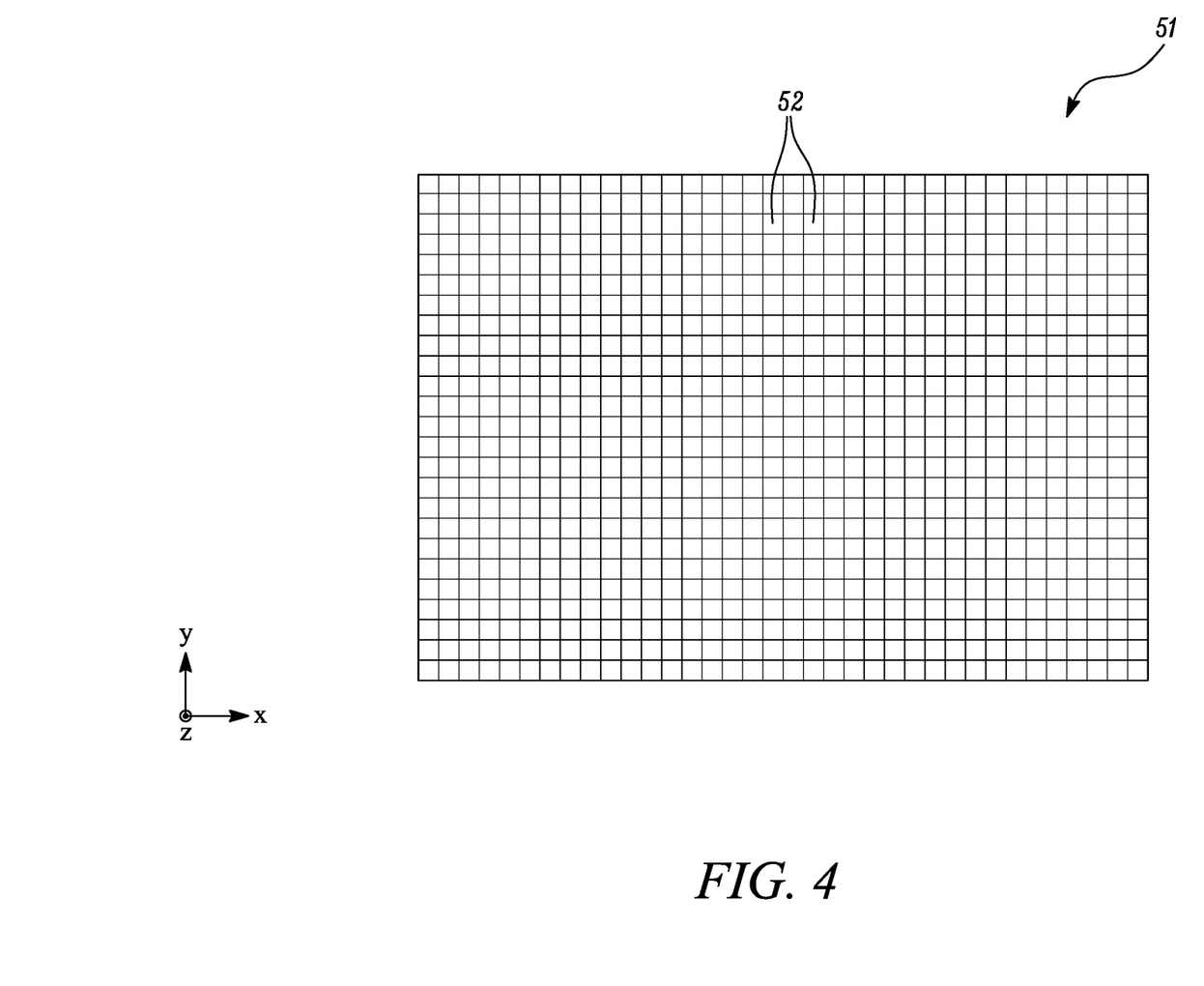
FIG. 4 is a schematic top view of a pixelated output surface of the display system of FIG. 1, according to an embodiment of the present disclosure.

The display system 300 is configured to display a pixelated image 50 at a pixelated output surface 51 thereof for viewing by the viewer 20. FIG. 4 is a schematic top view of the pixelated output surface 51, according to an embodiment of the present disclosure. Referring to FIGS. 1 and 4, the pixelated output surface 51 includes a plurality of two-dimensionally arranged output pixels 52. The plurality of output pixels 52 are arranged in the x-y plane of the display system 300. Each of the output pixels 52 is configured to emit an image cone 53 switchable between the different first and second polarization states by an applied signal. Specifically, each of the output pixels 52 is configured to emit the image cone 53 switchable between the different first and second polarization states in response to the respective first and second signals 51, S2 applied to the first polarization modifying layer 40.

In the illustrated embodiment of FIG. 1, each of the output pixels 52 is configured to emit a first image cone 53x for the first polarization state. In other words, each of the output pixels 52 is configured to emit the first image cone 53x in response to the first signal 51 applied to the first polarization modifying layer 40. The first image cone 53x has a first full angle θ1 illustrating a focused output image for viewing by the viewer 20. In this configuration, the first image cone 53x may be clearly visible to the on-axis viewer 20 and may not be clearly visible to a viewer (not shown) located at oblique viewing angles (i.e., an off-axis viewer). Therefore, in response to the first signal 51 applied to the first polarization modifying layer 40, the display system 300 is configured to display the pixelated image 50 at the pixelated output surface 51, such that the first image cone 53x having the first full angle θ1 is emitted. As a result, the display system 300 may operate in the privacy mode.

Further, each of the output pixels 52 is configured to emit a second image cone 53y for the second polarization state. In other words, each of the output pixels 52 is configured to emit the second image cone 53y in response to the second signal S2 applied to the first polarization modifying layer 40. The second image cone 53y has a second full angle θ2 illustrating a scattered output image for viewing by the viewer 20. In this configuration, the second image cone 53y may be clearly visible to the on-axis viewer 20 as well as the off-axis viewer. Therefore, in response to the second signal S2 applied to the first polarization modifying layer 40, the display system 300 is configured to display the pixelated image 50 at the pixelated output surface 51, such that the second image cone 53y having the second full angle θ2 is emitted. As a result, the display system 300 may operate in the sharing mode.

Switching the polarization state of the emitted image cone 53 between the first and second polarization states causes a full angle θ (full width at half maximum, i.e., FWHM) of the emitted image cone 53 to change by at least 2 degrees. In other words, a magnitude of a difference between the first and second full angles θ1, θ2 is at least 2 degrees. Specifically, switching the polarization state of the emitted image cone 53 between the first and second polarization states causes the image cone 53 to switch between the respective first and second image cones 53x, 53y. Therefore, in response to the first and second signals S1, S2 applied to the first polarization modifying layer 40, the image cone 53 is switched between the respective first and second image cones 53x, 53y having the respective first and second full angles θ1, θ2.

In some embodiments, switching the polarization state of the emitted image cone 53 between the first and second polarization states causes the full angle θ (full width at half maximum or FWHM) of the emitted image cone 53 to change by at least 5 degrees, at least 10 degrees, at least 15 degrees, at least 20 degrees, at least 30 degrees, at least 35 degrees, at least 40 degrees, at least 45 degrees, or at least 50 degrees.

As in some cases, the full angle θ of the image cone 53 changes by at least 10 degrees upon switching the polarization state of the image cone 53 between the first and second polarization states, or by switching the applied signal between the first and second signals S1, S2, there may be a considerable distinction between the privacy mode and the sharing mode of the display system 300. For example, as the full angle θ of the image cone 53 changes by at least 10 degrees upon switching the polarization state of the image cone 53 between the first and second polarization states, the off-axis viewer may not be able to clearly view the first image cone 53x that is intended to be viewed clearly by only the on-axis viewer 20. Therefore, the off-axis viewer may not be able to clearly view the first image cone 53x transmitted for the first polarization state that is selected by applying the first signal 51 to the first polarization modifying layer 40.

Further, for the first polarization state (e.g., selected by applying the first signal 51 to the first polarization modifying layer 40), the first image cone 53x has a first intensity Ix. For the second polarization state (e.g., selected by applying the second signal S2 to the first polarization modifying layer 40), the second image cone 53y has a second intensity Iy.

Switching the polarization state of the emitted image cone 53 between the first and second polarization states causes the full angle θ of the emitted image cone 53 to change by at least 2 degrees, while causing a total intensity of the emitted image cone 53 to change by less than about 20%. In other words, a magnitude of a difference between the first and second intensities Ix, Iy is less than about 20%. Specifically, switching the polarization state of the emitted image cone 53 between the first and second polarization states causes the total intensity of the image cone 53 to switch between the respective first and second intensities Ix, Iy of the respective first and second image cones 53x, 53y. Therefore, in response to the first and second signals S1, S2 applied to the first polarization modifying layer 40, the total intensity of the image cone 53 changes between the respective first and second intensities Ix, Iy of the respective first and second image cones 53x, 53y.

In some embodiments, switching the polarization state of the emitted image cone 53 between the first and second polarization states causes the total intensity of the emitted image cone 53 to change by less than about 15%, less than about 10%, less than about 5%, less than about 4%, less than about 3%, less than about 2%, or less than about 1%.

As described above, the total intensity of the image cone 53 changes by less than about 20% upon switching the polarization state of the image cone 53 between the first and second polarization states. Based on the applied signal (one of the first and second signals S1, S2), the image cone 53 is switchable between the first and second image cones 53x, 53y, and between the first and second polarization states. Therefore, the total intensity of the image cone 53 changes by less than about 20% upon switching the applied signal between the first and second signals S1, S2. In other words, the total intensity of the image cone 53 changes by less than about 20% upon switching between the privacy mode and the sharing mode.

Therefore, the first intensity Ix of the first image cone 53x differs by less than about 20% from the second intensity Iy of the second image cone 53y. In other words, the total intensity of the image cone 53 in the privacy mode of the display system 300 differs by less than about 20% from the total intensity of the image cone 53 in the sharing mode. In an example, upon switching the applied signal from the first signal 51 to the second signal S2, the total intensity of the image cone 53 may increase by less than about 20%. Further, upon switching the applied signal from the second signal S2 to the first signal 51, the total intensity of the image cone 53 may decrease by less than about 20%.

In other words, upon switching the display system 300 between the privacy and sharing modes, there is a minimal change in the total intensity of the image cone 53 for the on-axis viewer 20. This may improve an overall experience of the on-axis viewer 20 while viewing the image content on the display system 300 in the privacy mode as well as the sharing mode. Further, an axial luminance for the on-axis viewer 20 may change upon switching the display system 300 between the privacy and sharing modes. Particularly, in the privacy mode, the axial luminance may relatively increase and, therefore, brightness of the display system 300 may be adjusted to save power and allow a consistent experience to the on-axis viewer 20.

Moreover, as the display system 300 may not require use of any absorptive components prior to emitting the image cone 53, the display system 300 may therefore have an improved overall efficiency. The display system 300 uses only refractive elements to either focus or scatter an input light. The display system 300 may also be used for focusing and/or scattering a collimated input light incident on the one or more phase lens layers. A desirable output of the display system 300 may vary based on strength or optical power of the one or more phase lens layers 32.

Figure 5:
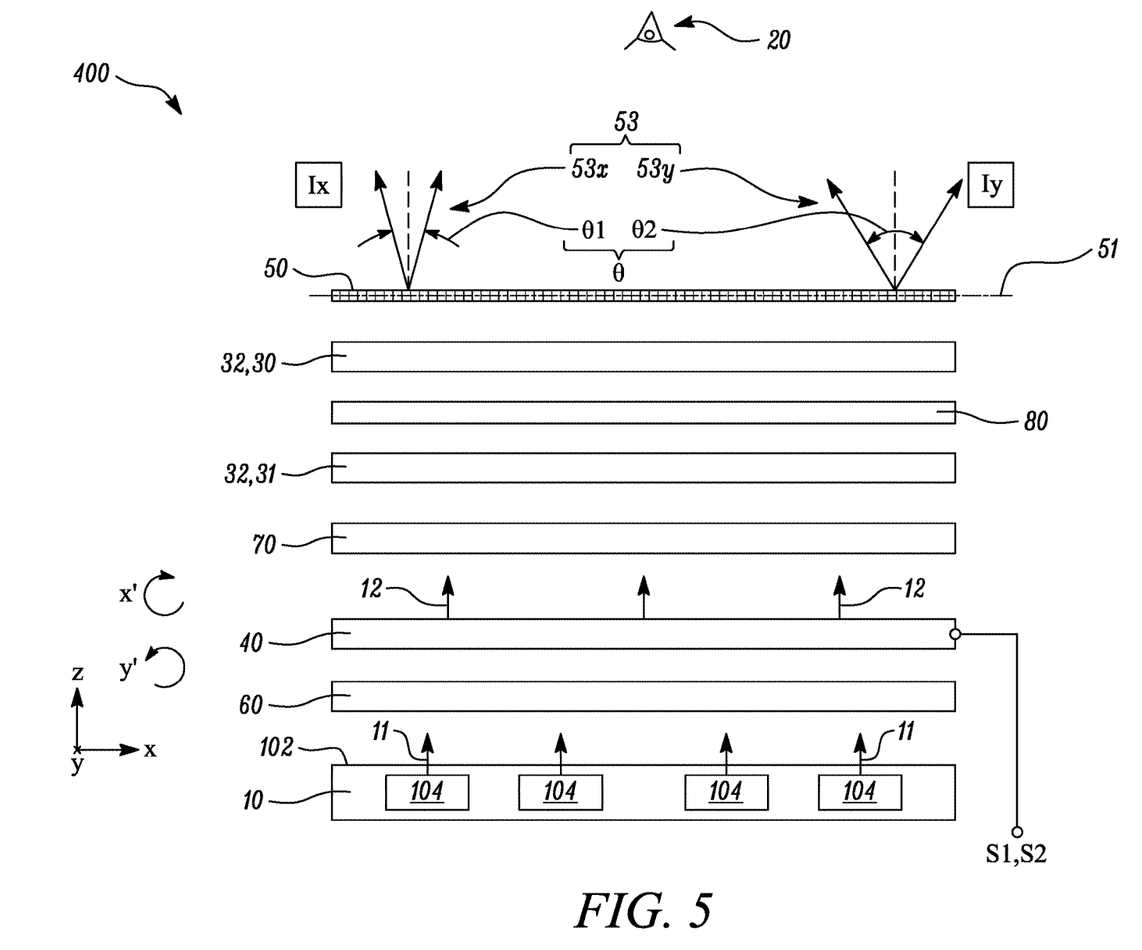
FIG. 5 is a schematic sectional view of a display system, according to another embodiment of the present disclosure.

FIG. 5 is a schematic sectional view of a display system 400, according to another embodiment of the present disclosure. The display system 400 is substantially similar to the display system 300 of FIG. 1, with like elements designated by like reference characters. However, the display system 400 further includes a second phase lens layer 31. In other words, the one or more phase lens layers 32 includes at least the first and second phase lens layers 30, 31. The display system 400 further includes a half-wave retarder 80 disposed between the first and second phase lens layers 30, 31. As each of the one or more phase lens layers 32 may change the polarization state of an input image passing therethrough from the first polarization state to the second polarization state and vice versa, the half-wave retarder 80 disposed between the first and second phase lens layers 30, 31 may ensure that each of the one or more phase lens layers 32 focuses or scatters the input image based on the applied signal. Specifically, the half-wave retarder 80 may switch a polarization state of an output light received from the second phase lens layer 31 to a polarization state of an input light incident on the first phase lens layer 30.

In some instances, the one or more phase lens layers 32 (i.e., the second phase lens layer 31) may not fully switch a polarization state of an input light passing therethrough. In such instances, the half-wave retarder 80 may function as a polarization altering layer, so that the polarization state of an input light incident on the first phase lens layer 30 is same as the polarization state of an input light incident on the second phase lens layer 31.

Figure 6A:
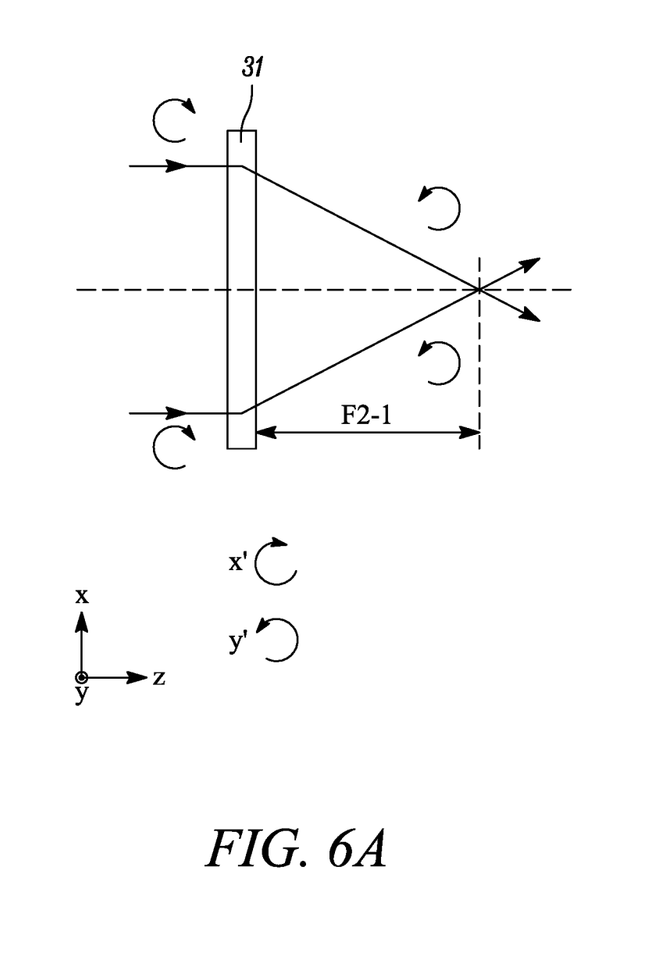
FIGS. 6A and 6B are schematic sectional views illustrating an operating principle of a second phase lens layer of the display system of FIG. 5, according to an embodiment of the present disclosure.

FIGS. 6A and 6B are schematic sectional views illustrating an operating principle of the second phase lens layer 31, according to an embodiment of the present disclosure. As shown in FIG. 6A, the second phase lens layer 31 has a first focal length F2-1 for the first polarization state (illustrated as the right circularly polarization state). The second phase lens layer 31 functions as the convex lens for the first polarization state (i.e., the right circularly polarization state). In other words, the second phase lens layer 31 focuses an input light having the first polarization state to transmit a focused output light having the second polarization state (i.e., the left circularly polarization state).

Figure 6B:
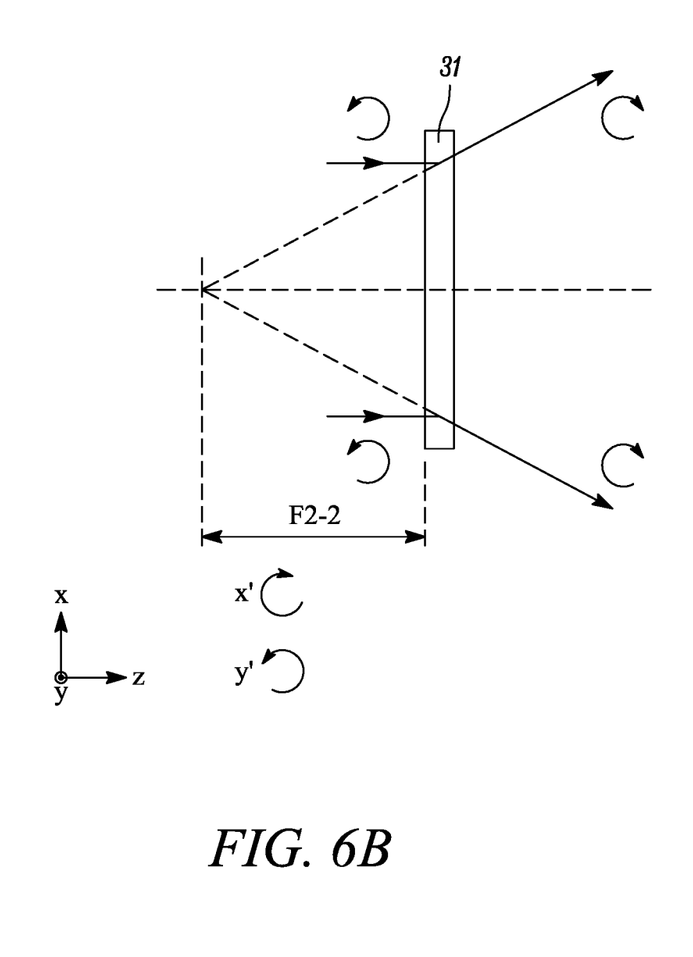

As shown in FIG. 6B, the second phase lens layer 31 has a second focal length F2-2 for the second polarization state (illustrated as the left circularly polarization state). The second phase lens layer 31 functions as the concave lens for the second polarization state (i.e., the left circularly polarization state). In other words, for the second polarization state, the second phase lens layer 31 scatters an input light having the second polarization state to transmit a scattered output light having the first polarization state (i.e., the right circularly polarization state). With reference to FIGS. 6A and 6B, the second phase lens layer 31 is configured to have the different first and second focal lengths F2-1, F2-2 for the different respective first and second polarization states.

Therefore, with reference to FIGS. 2A, 2B, 6A, and 6B, each of the one or more phase lens layers 32 is configured to have the different first and second focal lengths (i.e., the first focal lengths F1-1, F2-1 and the second focal lengths F2-2, F2-2) for the different respective first and second polarization states.

In some embodiments, the first focal lengths F1-1, F2-1 of the first and second phase lens layers 30, 31 are within 30% of each other. In some embodiments, the first focal lengths F1-1, F2-1 of the first and second phase lens layers 30, 31 are within 25%, within 20%, within 15%, within 10%, or within 5% of each other.

In some embodiments, the second focal lengths F1-2, F2-2 of the first and second phase lens layers 30, 31 are within 30% of each other. In some embodiments, the second focal lengths F1-2, F2-2 of the first and second phase lens layers 30, 31 are within 25%, within 20%, within 15%, within 10%, or within 5% of each other.

In some other embodiments, the first focal lengths F1-1, F2-1 of the first and second phase lens layers 30, 31 are different by at least 30%. In some embodiments, the first focal lengths F1-1, F2-1 of the first and second phase lens layers 30, 31 are different by at least 35%, at least 40%, at least 45%, at least 50%, at least 55%, or at least 60%.

In some other embodiments, the second focal lengths F1-2, F2-2 of the first and second phase lens layers 30, 31 are different by at least 30%. In some embodiments, the second focal lengths F1-2, F2-2 of the first and second phase lens layers 30, 31 are different by at least 35%, at least 40%, at least 45%, at least 50%, at least 55%, or at least 60%.

Figure 7:
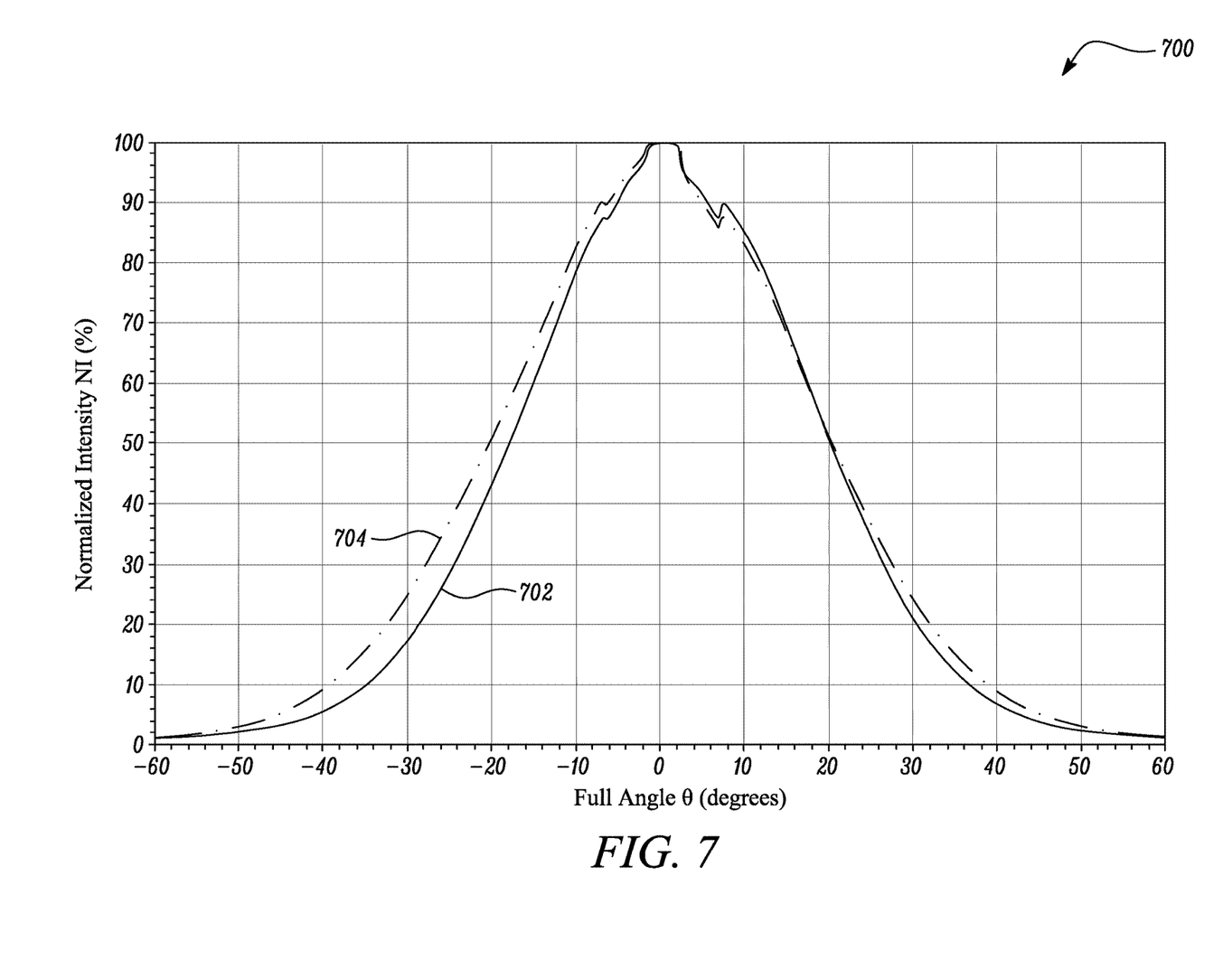
FIG. 7 is a graph illustrating normalized intensity versus full angle of an image cone for the display system of FIG. 1, according to an embodiment of the present disclosure.

FIG. 7 is a graph 700 illustrating a normalized intensity NI versus a full angle θ of the emitted image cone 53 for the display system 300 of FIG. 1, according to an embodiment of the present disclosure. The normalized intensity NI is expressed as an intensity percentage in the ordinate. The full angle θ (i.e., polar angle) is expressed in degrees in the abscissa. The graph includes curves 702, 704.

In the illustrated example, the first phase lens layer 30 has f-number of 1.4. In general, for a lens, "f-number" or "f-stop" or "focal ratio" is a ratio of a focal length to an aperture diameter of that lens and indicates an amount of light passing through the lens. A lens is typically specified with their maximum aperture ability. A low f-number means a larger maximum aperture (also called a fast lens), which results in a higher light or infrared collecting ability. A high f-number means a smaller aperture (slow lens), which has lower light or infrared collecting ability. The lower the f-number, the better the lens may be for visible and near infrared imaging.

Referring to FIGS. 1 and 7, for the first polarization state in the display system 300, the curve 702 depicts the variation in the normalized intensity NI with the full angle θ of the image cone 53, i.e., the first image cone 53*x*. In other words, the curve 702 depicts the variation in the normalized intensity NI with the full angle θ of the image cone 53 when the first signal S1 is applied to the first polarization modifying layer 40. Therefore, the curve 702 depicts the variation in the normalized intensity NI with the full angle θ of the image cone 53 when the display system 300 is operating in the privacy mode.

For the second polarization state in the display system 300, the curve 704 depicts the variation in the normalized intensity NI with the full angle θ of the image cone 53, i.e., the second image cone 53*y*. In other words, the curve 704 depicts the variation in the normalized intensity NI with the full angle θ of the image cone 53 when the second signal S2 is applied to the first polarization modifying layer 40. Therefore, the curve 704 depicts the variation in the normalized intensity NI with the full angle θ of the image cone 53 when the display system 300 is operating in the sharing mode.

As is apparent from the curves 702, 704 of the graph 700 for the display system 300, for the off-axis viewer, the normalized intensity NI in the sharing mode (when the second signal S2 is applied) is greater than the normalized intensity NI in the privacy mode (when the first signal S1 is applied). Further, as is apparent from the curves 702, 704, the total intensity (e.g., the normalized intensity NI) of the emitted image cone 53 changes by a small percentage value upon switching the polarization state of the emitted image cone 53 between the first and second polarization states. Particularly, the normalized intensity NI of the emitted image cone 53 changes by less than 20% upon switching the polarization state of the emitted image cone 53 between the first and second polarization states. In some cases, the normalized intensity NI of the emitted image cone 53 changes by less than 5% upon switching the polarization state of the emitted image cone 53 between the first and second polarization states.

It can also be concluded that for narrow viewing angles or for the on-axis viewer 20, the normalized intensity NI may show a little variation upon switching the polarization state of the image cone 53 between the first and second polarization states. Specifically, for narrow viewing angles or for the on-axis viewer 20, the normalized intensity NI may undergo a little variation upon switching the modes of the display system 300 between the privacy and sharing modes. Therefore, upon applying any of the first and second signals S1, S2 to the first polarization modifying layer 40, the on-axis viewer 20 may not experience a significant change in the light intensity, and eventually the viewing experience of the on-axis viewer 20 may not be significantly affected upon switching between the sharing mode and the privacy mode of the display system 300. Moreover, it may also be apparent from the curves 702, 704 that a viewer positioned at wider viewing angles may experience a relatively clear view of the image content of the display system 300 in the sharing mode.

Figure 8:
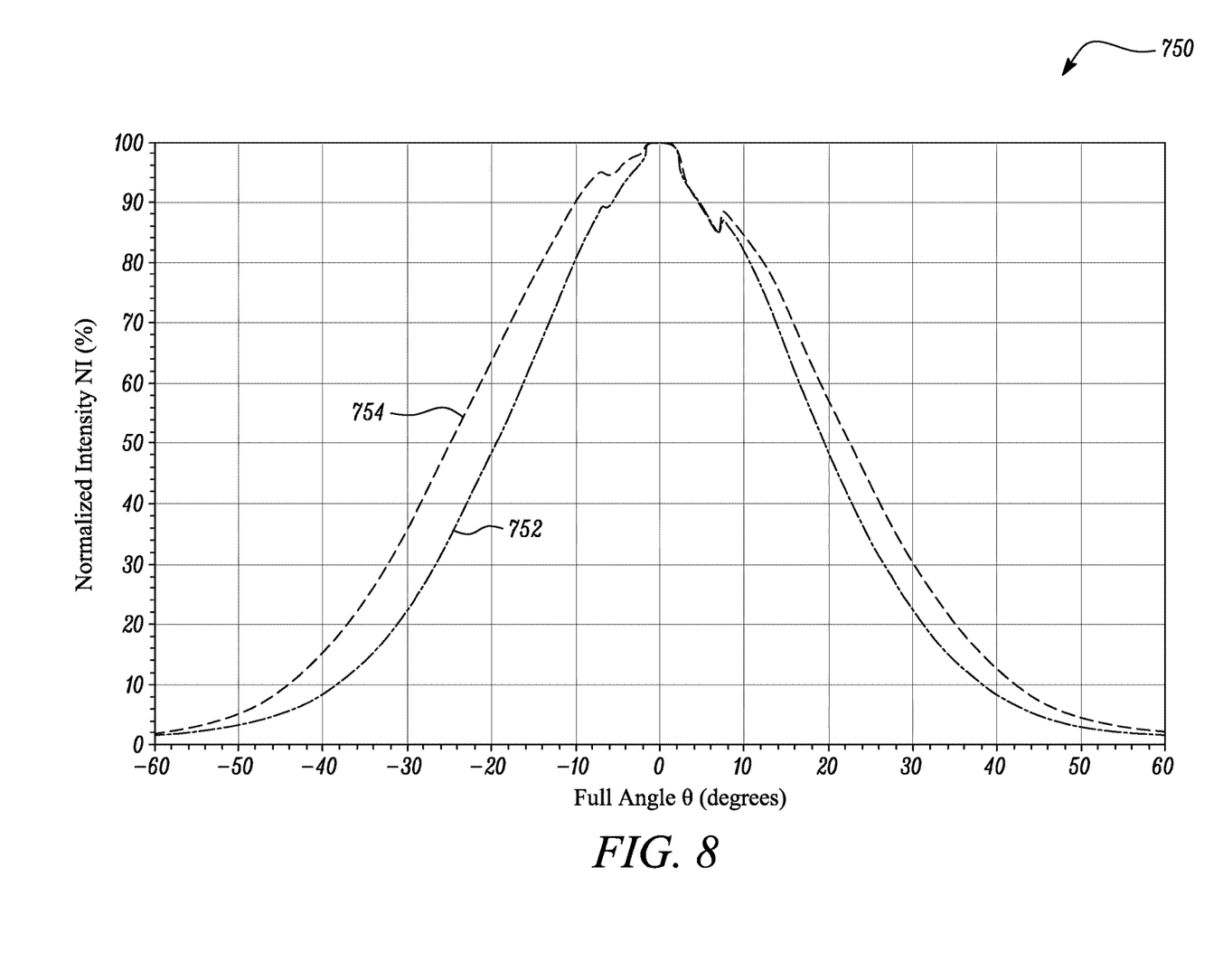
FIG. 8 is a graph illustrating normalized intensity versus full angle of an image cone for the display system of FIG. 5, according to an embodiment of the present disclosure.

FIG. 8 is a graph 750 illustrating the normalized intensity NI versus the full angle θ of the emitted image cone 53 for the display system 400 of FIG. 5, according to an embodiment of the present disclosure. In this example, the first phase lens layer 30 (shown in FIG. 5) has f-number of 1.4 and the second phase lens layer 31 (shown in FIG. 5) has f-number of 4. The graph 750 includes curves 752, 754.

Referring to FIGS. 5 and 8, for the first polarization state in the display system 400, the curve 752 depicts the variation in the normalized intensity NI with the full angle θ of the image cone 53, i.e., the first image cone 53x. In other words, the curve 752 depicts the variation in the normalized intensity NI with the full angle θ of the image cone 53 when the first signal 51 is applied to the first polarization modifying layer 40. Therefore, the curve 752 depicts the variation in the normalized intensity NI with the full angle θ of the image cone 53 when the display system 400 is operating in the privacy mode.

For the second polarization state in the display system 400, the curve 754 depicts the variation in the normalized intensity NI with the full angle θ of the image cone 53, i.e., the second image cone 53y. In other words, the curve 754 depicts the variation in the normalized intensity NI with the full angle θ of the image cone 53 when the second signal S2 is applied to the first polarization modifying layer 40. Therefore, the curve 754 depicts the variation in the normalized intensity NI with the full angle θ of the image cone 53 when the display system 400 is operating in the sharing mode.

As is apparent from the curves 752, 754 of the graph 750 for the display system 400, for the off-axis viewer, the normalized intensity NI in the sharing mode (when the second signal S2 is applied) is greater than the normalized intensity NI in the privacy mode (when the first signal 51 is applied). Referring to FIGS. 7 and 8, upon comparing the graph 700 and the graph 750, it can be concluded that the characteristics of both the graphs 700, 750 are substantially similar in nature.

Figure 9:
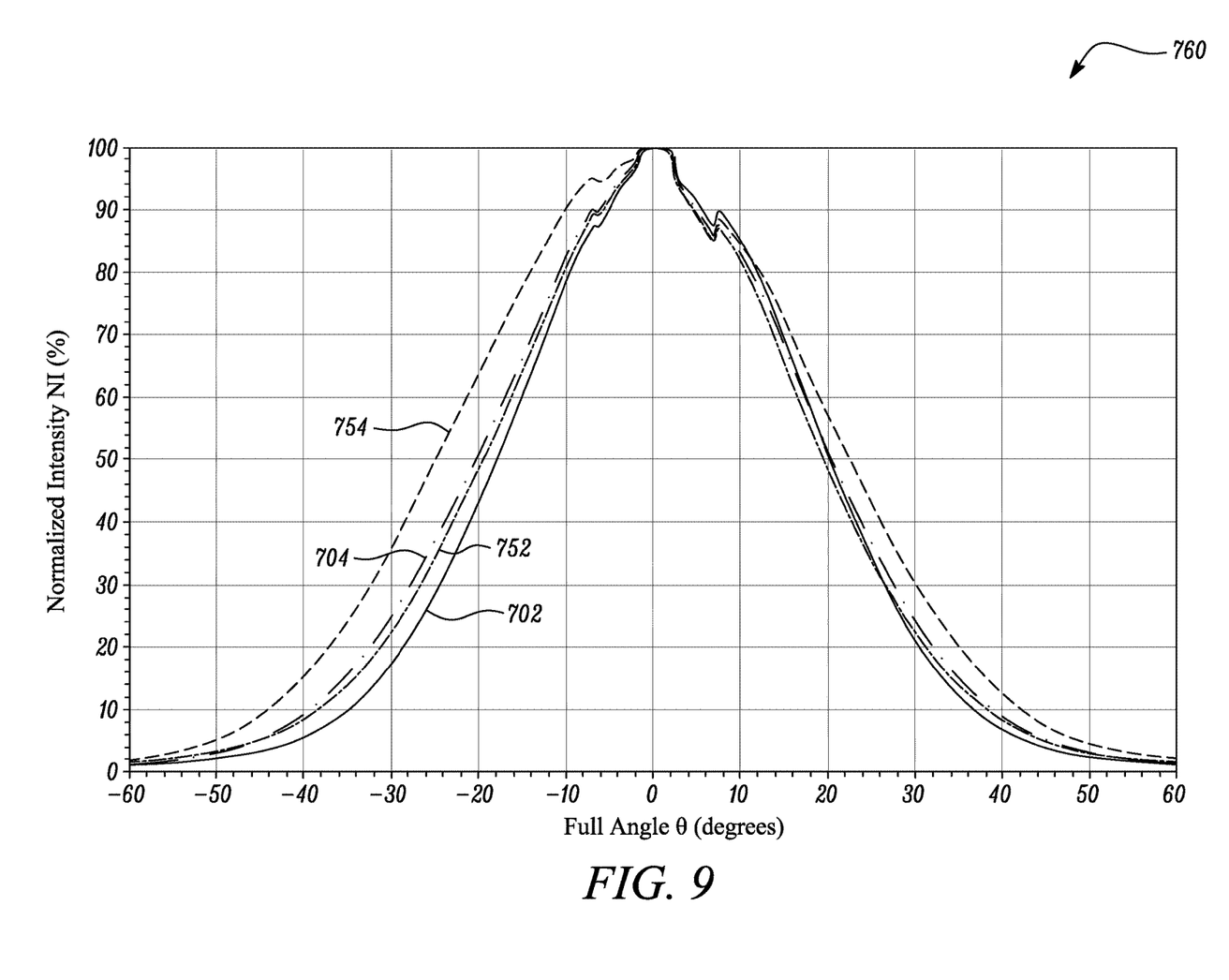
FIG. 9 is a graph illustrating normalized intensity versus full angle of both the graphs of FIGS. 7 and 8.

FIG. 9 is a graph 760 illustrating the normalized intensity NI versus the full angle θ of both the graphs 700, 750 of FIGS. 7 and 8, respectively. Referring to FIGS. 1, 5, and 9, upon comparing the curve 702 with the curve 752, the curve 752 is relatively slightly scattered over a range of the full angle θ of the image cone 53. This means that for the off-axis viewer in the privacy mode, the display system 400 including the first and second phase lens layers 30, 31 may generate a relatively higher normalized intensity NI than the display system 300 including the first phase lens layer 30. However, for the on-axis viewer 20 in the privacy mode, the normalized intensity NI of the image cone 53x generated by each of the display systems 300, 400 is substantially same.

Upon comparing the curve 704 with the curve 754, the curve 754 is also relatively scattered over a range of the full angle θ of the image cone 53. This means that for the off-axis viewer in the sharing mode, the display system 400 including the first and second phase lens layers 30, 31 may generate a relatively higher normalized intensity NI than the display system 300 including the first phase lens layer 30.

Hence, it can be concluded that for a given viewing angle, the display system 400 including a stack of phase lens layers (i.e., the first and second phase lens layers 30, 31) may generate a relatively higher light intensity in the sharing as well as privacy modes than the display system 300 including one phase lens layer (i.e., the first phase lens layer 30). In other words, as compared to the display system 300, the display system 400 with an additional phase lens layer (i.e., the second phase lens layer 31) may result in an increased spreading or diffusion of light (image) generated by the display system 400.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A display system comprising:
   a display configured to emit an image for viewing by a viewer;
   one or more phase lens layers disposed on, and substantially co-extensive in length and width with, the display, each of the one or more phase lens layers configured to have different first and second focal lengths for different respective first and second polarization states; and
   a first polarization modifying layer disposed between the display and the one or more phase lens layers and configured to receive the emitted image and transmit a transmitted image, the transmitted image having the first and second polarization states in response to different respective first and second signals applied to the first polarization modifying layer;
   wherein the first focal length of the one or more phase lens layers is configured to focus the emitted image for viewing in a privacy mode, and the second focal length of the one or more phase lens layers is configured to scatter the emitted image for viewing in a sharing mode.

2. The display system of claim 1, wherein the first and second polarization states are orthogonal to each other.

3. The display system of claim 1, wherein the first and second polarization states are right and left circularly polarization states, respectively.

4. The display system of claim 1, wherein the one or more phase lens layers comprises at least first and second phase lens layers.

5. The display system of claim 4, wherein the first focal lengths of the first and second phase lens layers are within 30% of each other.

6. The display system of claim 4, wherein the second focal lengths of the first and second phase lens layers are within 30% of each other.

7. The display system of claim 4, wherein the first focal lengths of the first and second phase lens layers are different by at least 30%.

8. The display system of claim 4, wherein the second focal lengths of the first and second phase lens layers are different by at least 30%.

9. The display system of claim 4 further comprising a half-wave retarder disposed between the first and second phase lens layers.

\* \* \* \* \*